UNITED STATES PATENT OFFICE.

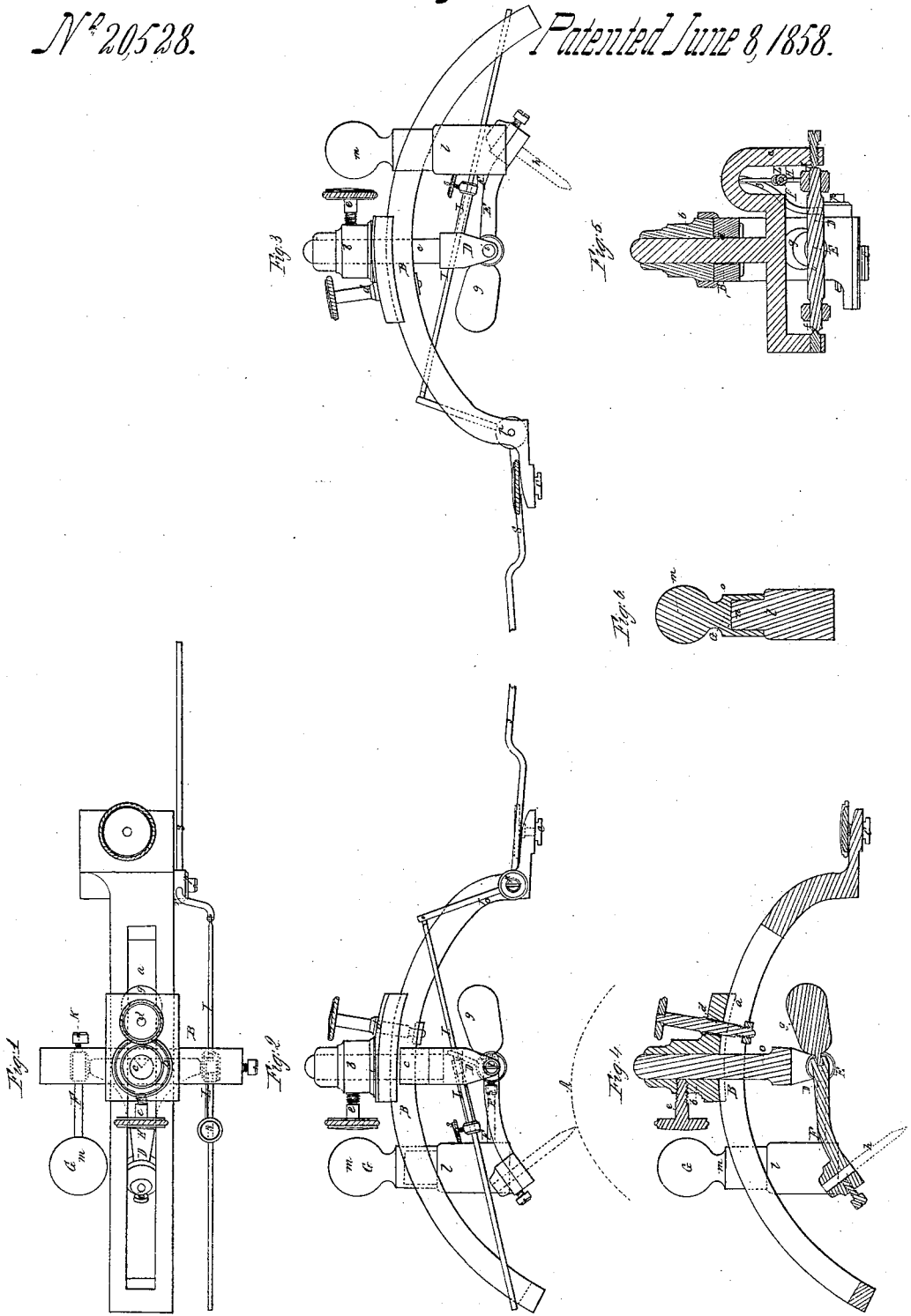

J. HOPE, OF PROVIDENCE, RHODE ISLAND, ASSIGNOR TO HIMSELF AND THOS. HOPE, OF SAME PLACE.

SUPPORTING AND ADJUSTING GRAVERS FOR ENGRAVING-MACHINES.

Specification of Letters Patent No. 20,528, dated June 8, 1858.

*To all whom it may concern:*

Be it known that I, JOHN HOPE, of the city and county of Providence and State of Rhode Island, have invented a new and useful mechanism or apparatus for supporting and adjusting a graver of a machine for engraving the surface of a calicoprinter's roller preparatory to the same being etched; and I do hereby declare that such apparatus is fully described and represented in the following specification and the accompanying drawings, of which—

Figure 1, is a top view of it. Figs. 2, and 3, opposite side elevations of it. Fig. 4, a vertical central and longitudinal section, and Fig. 5, a vertical and transverse section of it.

The mechanism constituting my said invention is intended to be applied to a machine of the kind described in the specification of the United States Patent, numbered 13462, granted to me and Thomas Hope on the 21st day of August, 1835. In its application to such machine, my invention is to take the place of the usual graver lever and is to be fastened to the carriage employed to support such graver lever. It is also to extend from the said carriage over and partly around the roller to be engraved, the position of the said roller with respect to the apparatus being exhibited by dotted lines at A, in Fig. 2.

In carrying out my invention, I employ a curved slotted arm, stand or bar B, which by means of a clamp C, applied to it, as shown in the drawings, is to be affixed to the movable carriage by which the graver levers are generally sustained in the engraving machines, such carriage being marked C, in the drawings of said patent numbered 13462. This bar B is constructed with a slot, *a*, formed longitudinally in it as shown in Figs. 1, and 4, and it supports a tracer or graver carriage D, which is constructed in two parts, *b, c*. The first part *b*, rests and slides on the top of the bar B, and has a clamp, *d*, by which it may be fastened in any position on the bar. The part *c*, is bifurcated and extends upward through the slot, *a*, and the part, *b*, and is secured to the latter by means of a clamp screw, *e*, the whole being formed and arranged as shown in the drawings. By reason of the peculiar construction of the part, *c*, and its application to the part, *b*, the said part, *c*, may be adjusted, or in other words, moved farther from or nearer to the surface of the cylinder to be engraved.

In the opening of the forked part, *c*, is a graver lever, E, which turns vertically on pivots or points arranged as shown at, *f, f*, in Fig. 5. This graver lever or carrier is balanced by a weight, *g*, applied to it as shown in Figs. 1, 2 and 4, the graver being fastened in the said lever in the position as indicated by dotted lines at *h*, in Figs. 3 and 4. An arm, F, turns vertically on the shaft, *i*, of the graver lever and has a small set screw K, by which it may be clamped to the shaft. This arm supports a weight, G, which is constructed in two parts, *l, m*, one of which, viz., the part *m*, is separate from the other, or part, *l*, and rests, upon it, and is supported in place by a projection or tenon, *n*, from the part *l*, being made to enter a corresponding mortise *o*, formed in the said part, *m*, the same being as shown in Fig. 6, which is a vertical section of the two parts. Another arm, H, is placed on and made to project from the shaft, *i*, it being applied to the shaft, so as to be capable of being turned vertically therein by a set screw. A rod, I, extends and slides freely through the arm H, and is jointed at its rear end to a bent lever S which turns on a fulcrum, *p*, and toward and away from a stop, *r*, projecting from the bar, B, as shown in Figs. 1, and 2. Furthermore, the rod I, carries an adjustable stop or slider L, which slides longitudinally on the rod and has a clamp screw, *s*, by which it may be fastened thereto. By depressing the longer arm of the lever S, the stop L, will be moved against the arm H, so as to cause such arm to move and turn the shaft of the graver lever in a manner so as to raise the graver off the surface of the roller on which it may be in action.

In calico printing roller engraving machines as usually constructed, the gravers when at work commonly rest on the extreme upper surface of the cylinder on which they may be operating, it being customary to engrave but one row of devices at one and the same time on the cylinder such row extending longitudinally of it.

By means of my improved apparatus, gravers or tracers may be made to operate on any part of the upper half of the surface of the cylinder as the bar, B, and carriage, D, of each graver lever, enables its graver to be adjusted to any position on the upper surface of the cylinder, and whatever may be the diameter of the cylinder. Thus in engraving a copper cylinder with my apparatus, it will not be necessary to arrange all the graver points on the extreme top part of the upper surface of the cylinder, as they may be placed in different positions or elevations on the upper half of the cylindric surface and in consequence thereof several rows or figures may be engraved at one and the same time, and thus the work of engraving a cylinder may be greatly facilitated in comparison to what can be done in the ordinary manner.

I would observe that in whatever position the graver may be arranged on the upper surface or half of the cylinder or roller, the arm, F, should be adjusted horizontally, for when all the arms of the different gravers are so arranged, each graver in consequence of the lever being balanced will be pressed on the cylinder with an equal force provided each weight G is alike, and has its center of gravity the same distance from the axis of the shaft of its graver lever. The object of making the weight, G, of the graver in two parts, $l$, $m$, is to furnish a convenient means of adjusting a graver to engraving either outlines or ground lines of the figure. In the process of engraving the ground lines, the movable part, $m$ of the weight is placed upon the stationary part, $l$, but while engraving the outlines which requires the graver to cut or simply mark in the varnish composition on the printing roller, the movable part should be off the part, $l$. At nearly every movement of the carriage D, on the bar B, the adjustable stop L, will require some new adjustment in order to enable the mechanism, by which the gravers are raised off the cylinder to correctly perform its office.

I claim—

1. The curved arm or bar B and the graver carriage D, as combined together and with the graver lever E, and made to operate therewith substantially as specified.

2. I also claim the adjustable weighted arm, F, in combination with the balanced tracer arm or graver E.

3. I also claim constructing the tracer carriage D, in two parts, $b$, $c$, substantially as described in order that the tracer or graver may be adjusted in a vertical direction to cylinders or rollers of different sizes.

4. I also claim making the arm, H, and the stop, L, adjustable on their shaft and rod as described in order to bring them into proper positions to cause the elevation of the graver under any situation of it on the surface of the cylinder, and when the lever, S, is moved backward.

5. I also claim making the weight G in two parts, $l$, $m$, for the purpose specified.

In testimony whereof I have hereunto set my signature.

JOHN HOPE.

Witnesses:
 FRANKLIN J. DICKMAN,
 T. F. CARPENTER.